Jan. 19, 1971 G. BANSE 3,555,750
TROLLEY RAIL BRACKET
Filed June 19, 1968
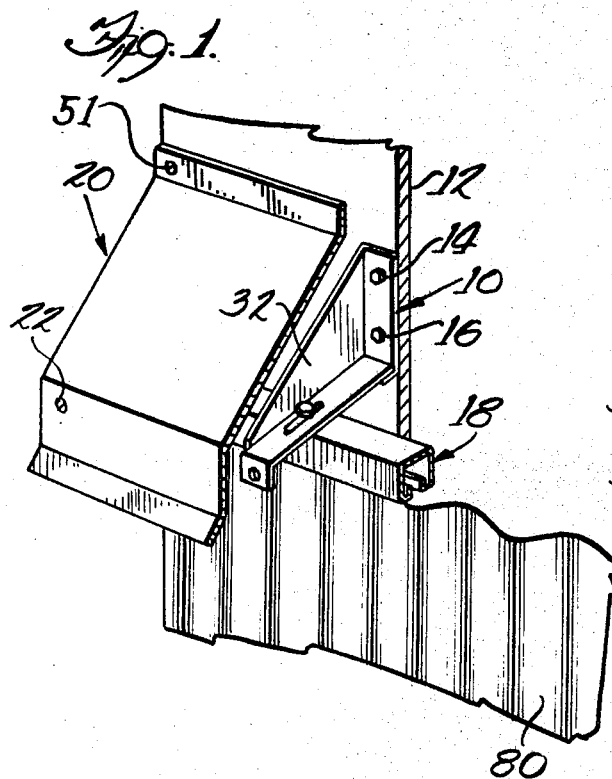
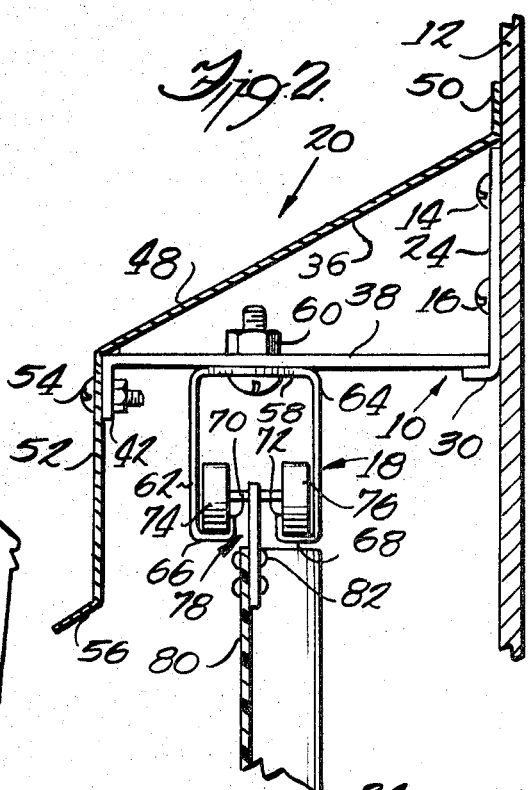
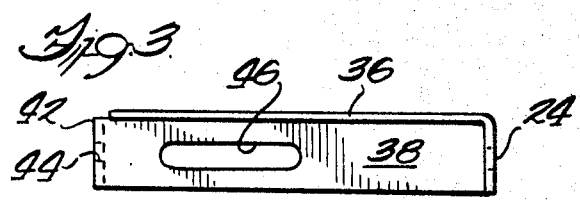
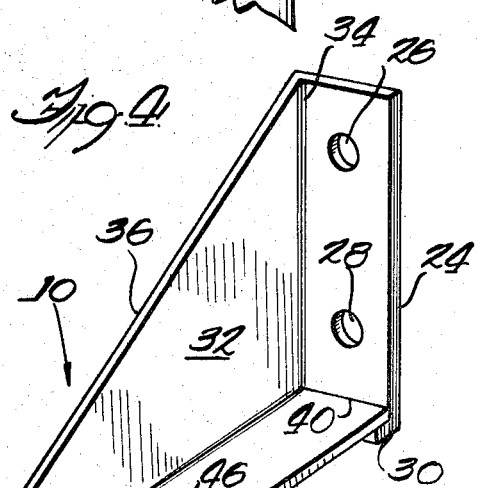
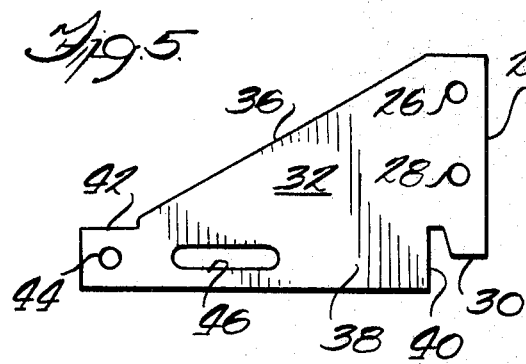
Inventor
George Banse
by: Fidler, Bradley & Patnaude
Att'ys

# United States Patent Office 3,555,750
Patented Jan. 19, 1971

3,555,750
TROLLY RAIL BRACKET
George Banse, Sterling, Ill., assignor to National Manufacturing Co., Sterling, Ill., a corporation of Illinois
Filed June 19, 1968, Ser. No. 738,210
Int. Cl. E04d 13/00
U.S. Cl. 52—97                                       8 Claims

ABSTRACT OF THE DISCLOSURE

The brackets that support the trolley rails for a sliding door each include a narrow vertical plate to be bolted to a wall. The vertical plate has a ledge integrally formed with its bottom edge and bent orthogonally therefrom and has a cross brace integrally formed with a side edge and bent outwardly and orthogonally therefrom. A horizontal plate is formed integrally with the bottom side of the cross brace and is bent upward and orthogonal thereto to rest upon the ledge of the vertical plate. The horizontal plate has a slot for the mounting of a track member by bolts and a downwardly turned tab at its end, which tab includes an aperture for fastening a flashing to the tab.

---

This invention relates to an apparatus for mounting hardware to a vertical wall and more particularly relates to apparatus for mounting sliding door hardware above a doorway.

One type of sliding door is mounted to and hangs from a trolley or track follower. The trolley moves on the rails of a track member that is parallel to the doorway and is supported by a bracket that is fastened to the wall above the doorway. Flashing is mounted over the bracket to protect the sliding door hardware from rain.

One type of bracket for supporting the sliding door hardware is generally L-shaped having a flat vertical plate that is fastened to the wall and a flat horizontal plate that extends outwardly from the bottom end of the flat vertical plate and is orthogonal to the flat vertical plate. A cross brace joins the vertical plate and horizontal plate. The track member is mounted to the horizontal plate by means of bolts.

In the prior art the cross brace of this type of bracket includes three sections, the first section extending at an angle between the flat vertical plate and the flat horizontal plate to provide support thereto. The second and third sections are end sections of the cross brace. The second section abuts and is parallel to the flat vertical plate to which it is fastened and the third section abuts and is parallel to the flat horizontal plate to which it is fastened. In the prior art hardware the flashing is generally attached to the flat vertical plate above the cross brace. The flat vertical plate is relatively wide in this type of prior art brace.

This type of prior art brace has several disadvantages. One disadvantage is that it is difficult to fasten the flashing to it. The flashing does not easily fit on top of the cross brace because the end portions of the cross brace interfere with a good fit. Another disadvantage of the prior art braces is that they are difficult to attach to the corrugated siding of some buildings. A tacking board is usually necessary or else there is some difficulty in keeping the vertical plate parallel to the general surface of the corrugated siding because the grooves interfere with the proper fit. Still another disadvantage of the prior art braces is that they are relatively expensive because they include a large number of parts. A still further disadvantage is that the track members are difficult to adjust in position since they are attached through bolt holes to the horizontal plate.

Accordingly, it is an object of this invention to provide an improved apparatus for mounting hardware.

It is another object of this invention to provide a bracket for trolley rails and flashing that is easily fastened to the bracket.

Another object of the invention is to provide a bracket for trolley rails in which the rails are easily adjusted in position.

Still another object of the invention is to provide an inexpensive bracket.

In accordance with the above and further objects of the invention a generally L-shaped bracket is provided for mounting trolley rails. The bracket includes a narrow flat vertical plate having bolt holes to permit it to be fastened to a vertical wall or support and having an integrally formed ledge at its lower end, which ledge is bent outward so as to be horizontal and perpendicular to the vertical plate. A cross brace is formed integrally with one side of the vertical plate and bent outwardly to be perpendicular to the vertical plate. A flat horizontal plate is formed integrally with the bottom edge of the cross brace and bent upward into a horizontal position so that its inner end rests against the ledge and it is orthogonal to the vertical plate. The flat horizontal plate has a downwardly turned tab at its outer end with an aperture extending therethrough for the mounting of flashing.

The flashing includes a downturned portion with an aperture aligned with the aperture in the tab. This downturned portion is fastened to the downwardly turned tab of the horizontal plate by bolts passing through the aligned apertures. The flashing also includes an angular upward portion conforming to the angle of the cross brace upon which it rests and terminating in a vertical flange which abuts the side of the building to protect the sliding door hardware from rain.

The horizontal plate includes a longitudinally extending slot from which the track member is supported by means of bolts. The bolts are moved backward or forward in the slot to adjust the position of the track member. The vertical plate is sufficiently narrow to fit easily within corrugations without tilting and to therefore permit the fastening of the brace to corrugated walls. The unit is inexpensive since it is formed integrally from one piece and yet provides a convenient manner of adjusting the position of the track member and of supporting the flashing.

The invention and the above noted and further features thereof will be better understood from the following detailed description when considered with reference to the accompanying drawings in which:

FIG. 1 is a perspective view partially broken away of a bracket and the sliding door hardware supported by the bracket which is an embodiment of the invention;

FIG. 2 is a sectional side view of the embodiment of the invention shown in FIG. 1;

FIG. 3 is a top view of the bracket which is included in an embodiment of the invention;

FIG. 4 is a perspective view of the bracket; and

FIG. 5 is a stamped blank of metal from which the bracket is formed by bending.

In FIG. 1 a perspective view of an embodiment of the invention is shown having a bracket 10 mounted to a wall 12 by means of the bolts 14 and 16 and supporting a trolley track member 18. A section of flashing 20 is supported on the bracket and held thereto by the bolts 22.

As best shown in FIG. 4 the brace 10 includes a narrow vertical plate 24 having two bolt holes 26 and 28 spaced along its central vertical axis to receive the bolts 14 and 16 (FIGS. 1 and 2) for fastening to a wall. The vertical plate 24 is 1⅛ inches wide and therefore fits easily into the grooves of the corrugations in corrugated siding. A horizontal edge 30 is formed integrally with the bottom edge of the vertical plate 24 and extends orthogonally thereto. A cross brace 32 is formed integrally with the side edge 34 of the vertical plate 24 and is bent outwardly to be orthogonal to the surface of the flat plate 24. It has an upper angular edge 36 extending from the top edge of the vertical plate 24 to the lower outer corner of the cross brace 32.

A flat horizontal plate 38 is formed integrally with the bottom edge of the cross brace 32 and is bent upward so that its innermost edge 40 rests upon the top of the ledge 30. The horizontal plate 38 has a longitudinal axis extending perpendicular to the surface of the vertical plate 24 and an integrally formed downwardly turned tab 42 at its outer end, which tab includes a bore 44. As best shown in FIGS. 3 and 4 the horizontal plate 38 includes a longitudinally extending slot 46 extending along a portion of its longitudinal axis.

As best shown in FIG. 2 the flashing 20 includes a flat angular portion 48 which rests upon the angular edge 36 of the cross brace 20 and an upwardly turned ear 50 which abuts the wall 12 and is fastened thereto by bolts, one (51) of which is shown in FIG. 1, to prevent water from seeping through onto the sliding door hardware. A downwardly turned end 52 of the flashing 20 extends from the angular portion 48 and is fastened to the tab 44 of the bracket 10 by means of a bolt and nut 54 which passes through aligned apertures in the downwardly turned end 52 of the flashing 20 and the tab 42 of the bracket 10. At the bottom edge of the downwardly turned end 52 is a flange 56 extending at an obtuse angle from the downwardly turned end 52. The flat vertical plate 24 fits flush against the wall and is easily inserted into the central portion of corrugations where it is fastened.

The trolley track member 18 is in the form of an inverted U having a top portion 58 abutting the bottom of the horizontal plate 38 and fastened thereto by a nut and bolt 60. The bolt passes through an aperture in the top portion 58 of the track member and through the overlying slot 46 of the horizontal plate 38 (FIGS. 3 and 4). The nut is screwed onto the shank of the bolt and rests on top of the horizontal plate 38 to hold the track member 18 tightly against the bracket. A plurality of brackets such as bracket 10 are spaced along the length of the rail to support it in the same manner as the bracket 10.

The track member further includes the downwardly extending sides 62 and 64, each of which is integrally connected with a different one of the two inwardly extending supporting portion 66 and 68 with upwardly extending flanges 70 and 72 respectively. The inwardly extending supporting portions 66 and 68 with their respective flanges 70 and 72 form two rails each of which supports a different one of the wheels 74 and 76 of the trolley 78. A sliding door 80 is supported by the trolley 78 by means of the hanger 82.

From the above desecription it can be understood that the bracket 10 is easily mounted to a wall 12 even though the wall is corrugated. A plurality of the brackets 10 are able to support a track member 18 parallel to the doorway so that a trolley 78 moves along the rails and carries a door 80 parallel to the doorway. The track member is adjustable to permit easy alignment with the doorway and wall of the building by loosening the nut and bolt 60 and moving it along the longitudinal slot 46.

The flashing 20 fits tightly against the wall 12 and is held securely by means of the nut and bolt 54 which passes through the downwardly turned position 52 of the flashing and the tab 42 of the bracket. The flashing is thereby easily fastened to the bracket and is supported upon the cross brace 36.

The bracket is stamped from sheet metal to form a blank having generally triangular portion and two generally rectangular portions integrally connected with it as shown in FIG. 5. Bolt holes and an elongated slot are stamped into the blank. The generally triangular portion becomes the cross brace 32 and the two generally rectangular portions become the vertical plate 24 and horizontal plate 38.

The vertical plate 38 is formed by bending the generally rectangular portion at right angles to the cross brace 32. Similarly, the horizontal plate 38 is formed by bending the other generally rectangular portion at right angles to the cross brace 32. The ledge 30 is then bent at right angles to the vertical plate 24 to lie under and support the end of the horizontal plate 38. The tab 42 is bent downwardly at right angles to the horizontal plate 38 to form the end tab. It can be understood from the above description that the bracket is formed easily and inexpensively.

Although an embodiment of the invention has been described with some particularity, many modifications and variations are possible in the invention in the light of the above teachings. It is therefore to be understood that, within the scope of the appended claims, the invention may be practiced otherwise than as specifically described.

What is claimed is:

1. Apparatus for mounting hardware comprising:
   a first plate having a first edge and a second edge;
   a second plate having a first edge and a second edge, and being rigidly fastened perpendicular to said first plate and abutting said first plate at said first edge of said second plate and extending orthogonally therefrom;
   said first and second plates each including at least one aperture whereby a fastener may connect said plates to other objects;
   said second edge of said second plate being opposite said plate from said first edge;
   a tab on said second edge, said tab being turned downward at an angle to said second plate and including an aperture; and
   a brace extending between said first and second plates and rigidly connected to each;
   said brace being formed integrally with and being orthogonal to both said first plate and said second plate.

2. Apparatus for mounting hardware according to claim 1 further including a flashing supported by said brace and a means for fastening said flashing to said tab.

3. Apparatus for mounting hardware according to claim 1 in which said first plate has an outwardly extending end abutting the bottom surface of said second plate.

4. Apparatus for mounting hardware according to claim 3 in which said first plate is approximately 1⅛ inches wide.

5. Apparatus for mounting hardware according to claim 4 in which said aperture in said second plate is a slot.

6. Apparatus for mounting hardware according to claim 5 in which said flashing includes a first angular portion adapted to fit across said brace, an upwardly turned end portion adapted to abut the surface to which said hardware is mounted, a downwardly turned portion adapted to be fastened to said tab, and a flange at the external end of said downwardly turned portion.

7. Apparatus for mounting hardware according to claim 5 in which said slot lies along the longitudinal axis of said second plate.

8. Sliding door hardware comprising the combination of a bracket according to claim 5 with a fastener adapted to pass through the aperture in said first plate and into the wall of a supporting building, a trolley rail, a bolt holding the trolley rail to said second plate and passing through an aperture and the top of said rail and said elongated slot, a bolt holding said tab to said downwardly turned end of said flashing, a trolley mounted within said rail, and a door hanger attached to said trolley and adapted to support a door.

References Cited

UNITED STATES PATENTS

| | | | |
|---|---|---|---|
| 591,235 | 10/1897 | Louden | 16—94 |
| 2,815,910 | 12/1957 | Baker | 248—300X |

FOREIGN PATENTS

| | | | |
|---|---|---|---|
| 695,487 | 8/1940 | Germany | 16—94 |
| 1,160,586 | 1/1964 | Germany | 16—94 |

ROY D. FRAZIER, Primary Examiner

J. F. FOSS, Assistant Examiner

U.S. Cl. X.R.

16—94; 160—345; 248—300